US010536564B2

(12) United States Patent
Bitz et al.

(10) Patent No.: US 10,536,564 B2
(45) Date of Patent: Jan. 14, 2020

(54) METHOD AND SYSTEM FOR PERFORMING COMMUNICATION OVER A WIDE AREA NETWORK VIA AN APPLICATION SPECIFIC PROTOCOL

(71) Applicant: Siemens Aktiengesellschaft, Munich (DE)

(72) Inventors: Alexander Bitz, Karlsruhe (DE); Andreas Baer, Pirmasens (DE); Wolfgang Fuesslein, Essingen (DE); Igor Milovanovic, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 302 days.

(21) Appl. No.: 15/489,185

(22) Filed: Apr. 17, 2017

(65) Prior Publication Data

US 2017/0310795 A1    Oct. 26, 2017

(30) Foreign Application Priority Data

Apr. 22, 2016  (EP) ..................................... 16166645
May 27, 2016  (EP) ..................................... 16171666

(51) Int. Cl.
*H04L 29/08* (2006.01)
*G06F 9/54* (2006.01)
(Continued)

(52) U.S. Cl.
CPC .............. *H04L 69/329* (2013.01); *G06F 9/54* (2013.01); *G06F 9/542* (2013.01); *G06F 9/544* (2013.01);
(Continued)

(58) Field of Classification Search
CPC . G06F 9/54; G06F 9/542; G06F 9/544; G06F 9/545; G06F 9/546; H04L 69/329
See application file for complete search history.

(56) References Cited

U.S. PATENT DOCUMENTS

2015/0281035 A1* 10/2015 Melikyan ................ H04L 67/42
                                                               709/224
2016/0323160 A1* 11/2016 Melikyan ................ G06F 3/067
(Continued)

OTHER PUBLICATIONS

Stefan Marr and . "Optimizing Communicating Event-Loop Languages with Truffle", Work-In-Progress Paper to the AGERE'15 Workshop colocated with SPLASH'15, Pittsburgh, PA, USA, 5 pages. (Year: 2015).*

(Continued)

*Primary Examiner* — George C Neurauter, Jr.
(74) *Attorney, Agent, or Firm* — Cozen O'Connor

(57) ABSTRACT

A automation system, a computer and method for communicating includes exchanging data, between a first computer, a second computer and at least one automation device over a wide area network via an application-specific protocol, wherein one of the computers has a local network connection to the automation device, the application-specific protocol has an application layer, and the first and second computers execute respective first and second automation programs such that a transparent connection is provided for the automation programs and their application-specific protocol beyond local network boundaries which can be it efficiently, where signaling functions from lower communication layers that are missing are simulated by introducing event loops on both sides of the communication.

16 Claims, 3 Drawing Sheets

(51) Int. Cl.
      *H04L 12/28*      (2006.01)
      *H04L 12/46*      (2006.01)

(52) U.S. Cl.
      CPC .............. *G06F 9/545* (2013.01); *G06F 9/546* (2013.01); *H04L 12/2854* (2013.01); *H04L 12/4633* (2013.01); *H04L 67/2823* (2013.01)

(56) References Cited

U.S. PATENT DOCUMENTS

| | | | |
|---|---|---|---|
| 2017/0147488 A1* | 5/2017 | Vaquero Gonzalez | ...................... H04L 12/6418 |
| 2018/0150385 A1* | 5/2018 | Diao | ................... G06F 11/3644 |

OTHER PUBLICATIONS

Erin Swenson-Healey. "The JavaScript Event Loop: Explained", carbonfive.conn, posted Oct. 27, 2013, 10 pages. (Year: 2013).*
Ingram "Reconfigurable Middleware for High Availability Sensor Systems", Jul. 6, 2009, pp. 1-11.

* cited by examiner

METHOD AND SYSTEM FOR PERFORMING COMMUNICATION OVER A WIDE AREA NETWORK VIA AN APPLICATION SPECIFIC PROTOCOL

BACKGROUND OF THE INVENTION

1. Field of the Invention

The invention relates to a method for communication between a first computer, a second computer and an automation system over a wide area network via an application-specific protocol.

2. Description of the Related Art

Application-specific protocols are to be understood in the present context as communication protocols that have been developed specifically for a particular application. This application may be, for example, the communication between an automation program and an automation device. Such protocols are accordingly different from manufacturer to manufacturer and are often proprietary. Furthermore, application-specific protocols are frequently formed for communication via a local network only, either because they are not based on the conventions/protocols that are applicable in wide area networks (e.g., Transmission Control Protocol/Internet Protocol (TCP/IP)) or because they simply lack security mechanisms for transmission over public or at least partially public networks.

Application-specific protocols are utilized in communications between automation or engineering software and the corresponding automation hardware. It is therefore desirable to create a possibility that is transparent to the hardware and software to also make application-specific protocols suitable for use in wide area networks. Applications of this type are particularly relevant to remote, cloud, and/or Industry 4.0 applications.

SUMMARY OF THE INVENTION

It is an object of the present invention to provide an automation system, a computer and a method which provides a transparent connection for an automation program and its application-specific protocol beyond local network boundaries and which can be implemented efficiently.

This and other objects and advantages are achieved in accordance with the invention via a method for communication, in particular for exchanging data, between a first computer, a second computer and at least one automation device over a wide area network via an application-specific protocol, where one of the computers has a local network connection to the automation device, wherein the application-specific protocol has an application layer, and where the first computer executes a first automation program and the second computer executes a second automation program.

The method comprises registering a first event loop having a first identification in the application layer of the application-specific protocol of one of the computers, establishing a communication channel between the first computer and the second computer, registering a second event loop having a second identification in the application layer of the application-specific protocol of the respective other computer and storing the first identification, storing the identification of the event loop for which the data is intended in the data, transferring the data to a send function, notifying the event loop whose identification is stored in the data that the data is ready for transmission, and retrieving the data over the communication channel via of a receive function.

In this context, a local network connection does not necessarily have to be a LAN or WLAN, Profibus, Profinet, USB or any other local data connections are equally conceivable.

Data, in this context, can be configuration and/or parameterization data for the automation device or commands for controlling the automation device. Status information is also conceivable as data, like any other type of data that can be transmitted in an automation environment. Here, the data could comprise data packets or data telegrams.

In the simplest case, the automation device may in this context be a single programmable logic controller (PLC) or a single automation component. On the other hand, the automation device may also assume an arbitrary complexity, e.g., can be a combination of different automation devices.

A computer may in this context be a PC, an industrial PC or any other type of computer. Portable devices, such as smartphones, tablets or laptops, are also conceivable as computers.

Wide area networks (WANs) are intended here to represent networks such as the Internet, for example, which are distinguished from the local networks by virtue of theft correspondingly greater coverage of a geographical area. In this context, the wide area networks may be used, for example, in order to connect two manufacturing sites.

The communication between the automation programs and the automation device may in this case also comprise the configuration of the automation device.

An event loop, in this context, is a program construct that waits for events or messages and distributes these events or messages within a program. Here, each event loop has a unique identification. In this case, identification may comprise a simple number up to and including a complex address.

Application-specific protocols, like standardized communication protocols (e.g., TCP/IP), have a structure known as a communication stack. This stack is composed of a number of layers, such as is known for example from the Open Systems Interconnection (OSI) model. The lower layers, in most cases layers 1 to 4, are in this regard responsible for bit transmission, error-free frame transfer, the switching of packets, and the transport of messages. Here, the upper layers are usually application-dependent. For the application-specific protocol, the upper layers are to be referred to in the following as application layers. It is conceivable here that only the very top layer, i.e., layer 7, for example, is the application layer, and the method in accordance with the invention is implemented directly beneath the application layer (e.g., layer 7). This has the advantage that the data that is to be transmitted is not yet packed into lower communication layers. An application layer is in this case for example a layer of the OSI model, termed the "Application Layer". The event loops are stored in the application layers. As a result, it is possible for the application-specific protocol to be usable over a wide area network e.g. via a Hyper Text Transfer Protocol (HTTPS) tunnel.

Communication operations, such as sending or receiving, are replaced in the application layer by proxy methods. Such proxy methods can then convert all calls, irrespective of the application-specific protocol for which they were originally conceived, into a standardized protocol, such as TCP/IP. With the proxy methods, it is possible to tunnel the communication operations and functions of the application-specific protocol across the network by way of an arbitrary standard connection. This may be, for example, VPN connections or equally TCP or HTTPS connections.

The automation program, which has a local network connection to the automation device, whose computer therefore has a local network connection to the automation device, is generally configured to communicate via an application-specific protocol in the local network (e.g., LAN).

The signaling functions from the lower communication layers are missing on account of the method in accordance with the invention. Consequently, these functions are simulated in accordance with the invention through the introduction of event loops on both sides of the communication.

The communication channel may be what is known as a callback communication channel, for example, which can be established via TCP or HTTPS or comparable protocols. The commands that are otherwise processed directly by way of the communication stack of the application-specific protocol are tunneled via the communication channel.

In an advantageous embodiment of the method, functions are implemented such that a proxy provides the functions as proxy functions and invokes these via the communication channel. For example, the functions are provided on a computer by the proxy. For the computer and its automation software, it is initially irrelevant whether the computer itself invokes the real functions or the original functions have been replaced by proxy functions. The proxy then takes over the handling of the function calls and thereupon invokes the functions on the respective other computer. The notification is handled in each case by way of the event loops. The proxy has the advantage that such a simple implementation enables the known functions to continue to be used and no changes need to be made to the automation program.

In a further embodiment of the method, the communication channel between the first computer and the second computer comprises a communication channel for callbacks. The channel, also known as a "callback communication channel", enables callbacks via the network, also referred to as "network callbacks". The presently contemplated embodiment makes use of the callbacks to achieve a more efficient implementation of the method in accordance with disclosed embodiments of the invention.

In a further embodiment of the method, notifications via the communication channel comprise callbacks. This is the consistent application of the callback functionalities to the method.

In a further embodiment of the method, the event loops comprise invisible windows of the operating system of the computers or the automation program. In this way, existing communication functions of the operating system or of the automation program may continue to be used without adversely affecting the user or the communication.

In a further embodiment of the method, the communication channel comprises a TCP or an HTTPS tunnel. Using a tunnel on one of the upper layers of the OSI model has the advantage that these are easy to handle, in particular in comparison with VPN connections.

It is also an object of the invention to provide an automation system that has a first computer, a second computer and at least one automation device.

The first computer can be connected to the second computer via a wide area network, where the first computer, the second computer and the automation device are configured to communicate via an application-specific protocol over a wide area network, and the application-specific protocol has an application layer. In addition, one of the computers has a local network connection to the automation device. A first automation program is executable on the first computer and a second automation program is executable on the second computer. Connections between the first computer and the second computer can be established via a communication channel over the wide area network and the computers and/or the automation programs are configured to perform the method in accordance with the disclosed embodiments of the invention.

In advantageous embodiment of the automation system, a proxy is configured to provide functions as proxy functions and to invoke the functions via the communication channel on the respective other computer. The proxy then handles the function calls and then invokes the functions on the respective other computer. The notification is handled in each case via the event loops. Here, the advantage lies in the simple implementation and the fact that no changes to the automation system are necessary.

In a further advantageous embodiment of the automation system, one of the computers comprises part of the automation device. This is of particular advantage in the case of highly integrated applications, because here the functionality of a computer of this type can be integrated directly into the automation device, e.g., via powerful, state-of-the-art systems-on-a-chip (SOCs).

In a further advantageous embodiment of the automation system, one of the computers comprises a virtual system. In particular with modern virtualization techniques or cloud applications, it is possible to perform the method in accordance with the disclosed embodiments of the invention on such systems. This is particularly efficient and future-proof.

It is also an object of the invention to provide a computer having a communication device which is configured to communicate via a wide area network and/or a local network. To this end, the computer is configured to execute an automation program and to perform the method in accordance with the disclosed embodiments of the invention. Furthermore, the computer may also comprise part of the automation device or a virtual system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in more detail below with reference to the exemplary embodiments illustrated in the figures, in which.

DETAILED DESCRIPTION OF THE EXEMPLARY EMBODIMENTS

Figure 1:
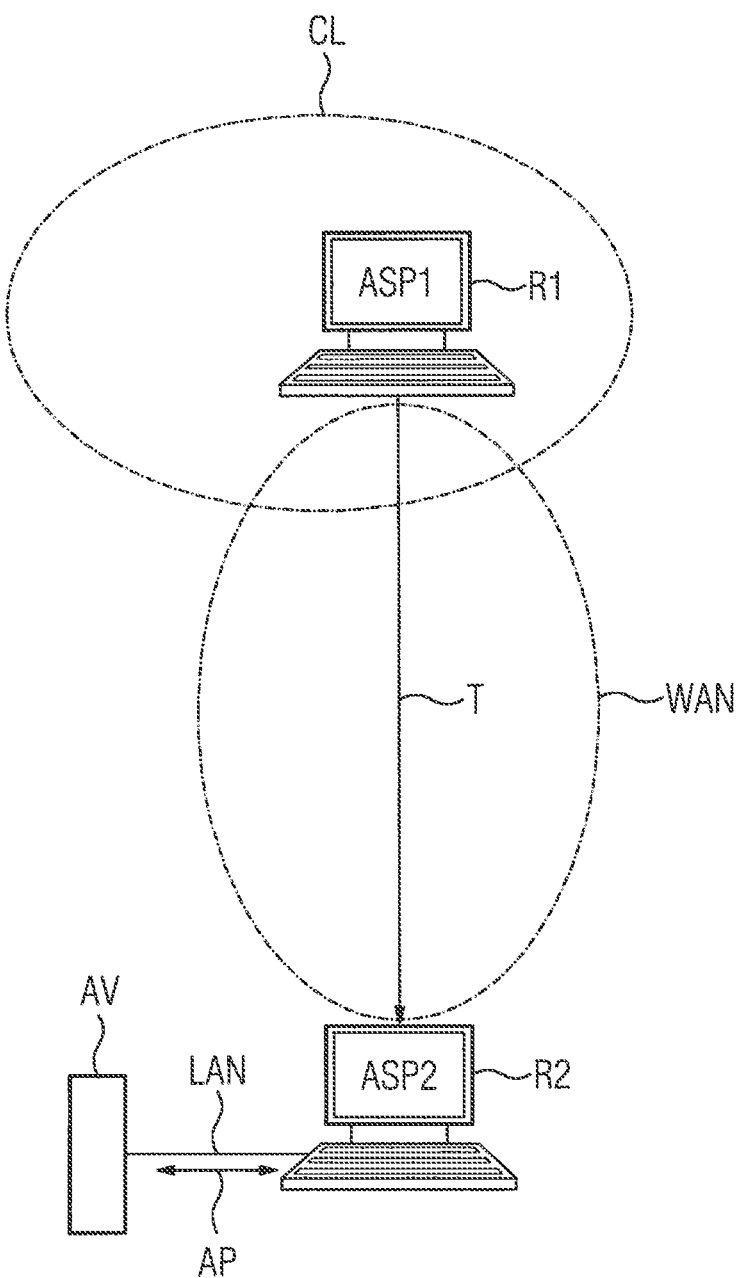
FIG. 1 shows a conventional automation system.

FIG. 1 shows quite generally a system in which the method in accordance with the invention may find application. Here, FIG. 1 shows a first computer R1, a second computer R2, and an automation device AV. The first computer R1 is connected to the second computer R2 via a wide area network. The second computer R2 is connected to the automation device AV via a local (area) network LAN. This is merely an example and it is equally conceivable for each of the two computers R1, R2 to be connected to an automation device AV via a local network LAN. A first automation program ASP1 executes on the first computer R1, and a second automation program ASP2 executes on the second computer R2. In this scenario, the first computer R1 may be, for example, a PC upon which a piece of engineering software executes as the first automation program ASP1. The second computer R2 may in this case be, for example, a PC upon which a piece of engineering software executes as the second automation program ASP2. The automation programs ASP1, ASP2 communicate via the tunnel T. Here, the tunnel T may comprise a TCP or an HTTPS tunnel. Any other tunnel protocols are likewise conceivable.

The first computer R1 is represented in this instance in a cloud CL. This is simply intended to indicate that the first computer R1 may be embodied both in virtualized form and physically as a remote computer. The cloud functionality is to be regarded as optional, but can be realized without difficulty via the method in accordance with the invention.

Figure 2:
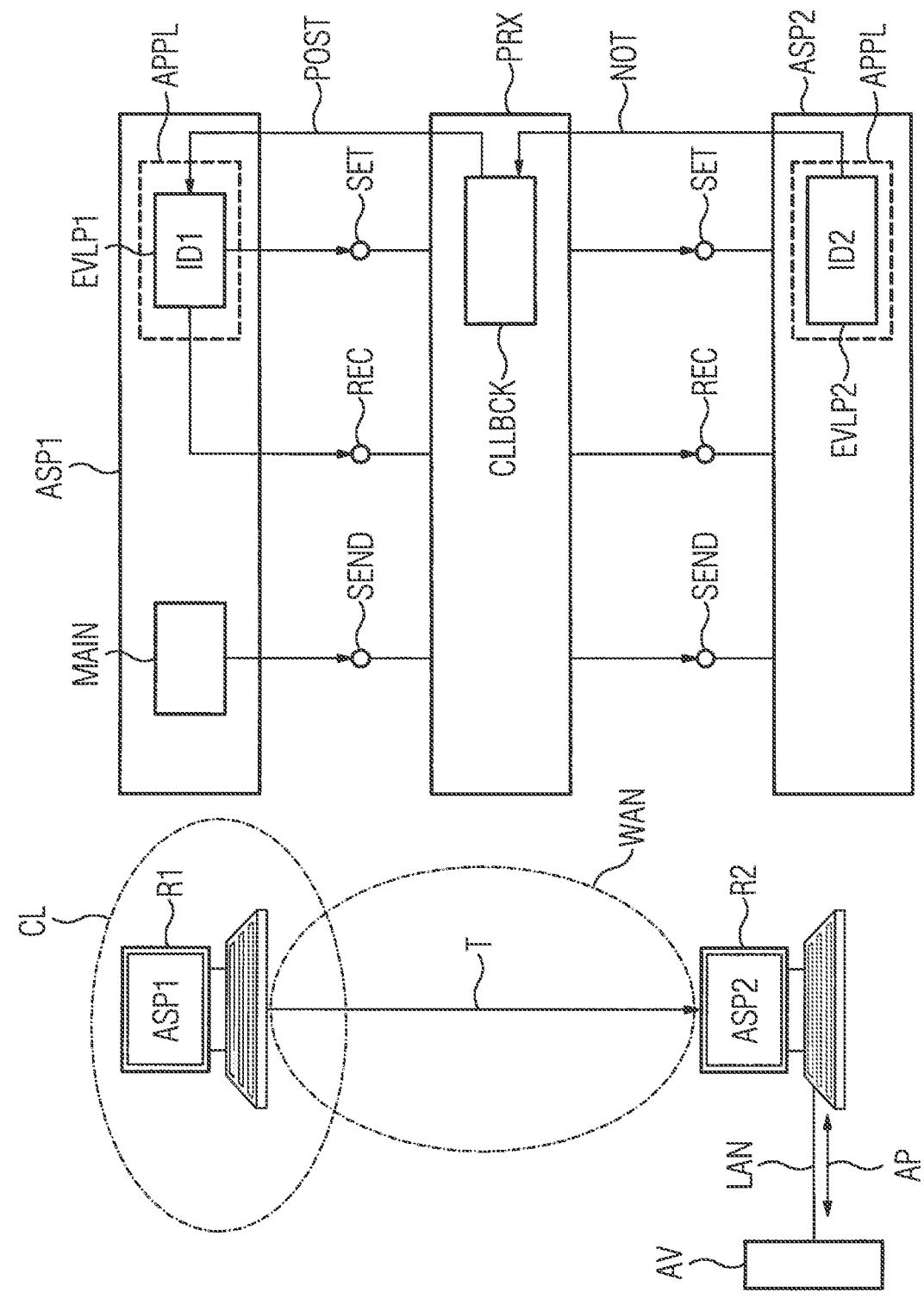
FIG. 2 shows an automation system which has been expanded by a scheme for communication by means of the method according to the invention.

It is also shown that the automation device AV communicates with the second computer R2 and the automation program ASP2 running thereon via an application-specific protocol AP. Application-specific protocols AP are to be understood, in this context, as communication protocols that have been developed specifically for the particular application. This application may be, for example, the communication between an automation program and an automation device, via a piece of engineering software, for example. Such protocols are accordingly different from manufacturer to manufacturer and are often proprietary. Furthermore, application-specific protocols AP are frequently configured to communicate via a local network LAN only, either because they are not based on the conventions/protocols that are applicable in wide area networks WAN (e.g., TCP/IP) or because they simply lack security mechanisms for transmission over public or at least partially public networks. The aim of the present invention is to make the functionalities of the application-specific protocol AP now available also to the first computer R1 and the automation program ASP1 running thereon. The second computer R2 is connected to the automation device AV via a local network LAN. As a result, the computer can communicate directly with the automation device AV via the application-specific protocol AP. Referring to FIG. 2, it is now illustrated how a possible embodiment of the invention enables a communication or, as the case may be, the transmission of data of the first computer R1 over a wide area network WAN via an application-specific protocol AP.

FIG. 2 shows, on the left-hand side, the system already illustrated in FIG. 1, with the same reference signs being retained. Visualized in addition, on the right-hand side, is an embodiment of the method in accordance with the invention. In this case, the first automation program ASP1, which executes on the first computer R1, has a main event loop MAIN and a first event loop EVLP1. In this case, main event loop MAIN may be, for example, the main window of the automation program ASP1 or execute therein. In this case, the three functions send SEND, receive REC and initialize SET are available to the automation program ASP1. Here, the functions SEND, REC, SET are replaced by functions of a proxy PRX. The proxy replaces the functions of the application layer APPL of the first computer R1 with its own proxy functions, which then invoke the corresponding functions SEND, REC, SET in the application layer APPL of the second computer R2. In this way, it is possible to distribute the communication stack of the application-specific protocol AP across a wide area network WAN and thereby make it also available to computers R1, R2 that do not have a local data connection or network connection to the automation device at their disposal. It is also conceivable that not all functions within the automation programs ASP1, ASP2 are made available, but that they are replaced by functions of the operating system used or of the proxy.

By way of example, the following method would execute in the visualization shown in FIG. 2. In the interests of better understanding, the relevant technical term is given in parentheses and quotation marks, in each case. Registering a first event loop EVLP1 ("event loop") having a first identification ID1 in the application layer APPL ("application layer") of the application-specific protocol AP of the first computer R1. Establishing a communication channel T between the first computer R1 and the second computer R. The communication channel T between the first computer R1 and the second computer R2 is in this case comprising a communication channel T for callbacks CLLBCK ("callback communication channel"). This can happen, e.g., via TCP or HTTPS.

The functions SEND, REC, SET are provided as proxy functions by a proxy PRX, which invokes them via the communication channel T, in this case on the second computer R2. To make this possible, a second event loop EVLP2 having a second identification ID2 is registered on the side of the second computer R2 in the application layer APPL of the application-specific protocol AP, and the first identification ID1 of the first event loop EVLP1 is stored as a communication partner. It is thus possible to assign which two event loops EVLP1, EVLP2 communicate with one another, i.e., via which route the application-specific protocol AP is enabled outside of a local network LAN. The identifications ID1, ID2 can be stored directly in the event loops EVLP1, EVLP2 or elsewhere in other parameters. The first identification ID1 is required to assign the event loops EVLP1, EVLP2 to one another. This is highly relevant in particular in the case of systems in which many automation devices AS are intended to communicate with a significantly greater number of computers.

In order to send data, the identification ID1, ID2 of the event loop EVLP1, EVLP2 for which the data is intended is stored in the data. In this way, it is always clear which of the event loops EVLP1, EVLP2 will handle the reception of the data. The data is transferred to a send function SEND and the event loop EVLP1, EVLP2 whose identification ID1, ID2 is stored in the data is notified that the data is ready for transmission. Finally, whenever such a notification arrives, the readied data can be retrieved via a receive function REC via the communication channel T ("method call over a network callback channel"). The way in which the event loops EVLP1, EVLP2, the application layers APPL and the automation programs ASP1, ASP2 are represented and arranged is to be understood here exemplary and it is also possible to realize a different arrangement in other systems while retaining the method in accordance with the invention. For example, an embodiment in which the second computer R2 forms part of the automation device AV would be advantageous here. The local network connection LAN could then be an internal connection in the automation device AV, or even merely the communication within the operating system of the automation device AV.

In sum, the invention relates to a method for communication, in particular for exchanging data, between a first computer R1, a second computer R2 and at least one automation device AV over a wide area network WAN via an application-specific protocol AP, wherein one of the computers R1, R2 has a local network connection LAN to the automation device AV, where the application-specific protocol AP has an application layer APPL, and where the first computer R1 executes a first automation program ASP1 and the second computer R2 executes a second automation program ASP2. In order to provide an automation system, a computer R1, R2 and a method which provides a transparent connection for an automation program ASP1, ASP2 and its application-specific protocol AP beyond local network boundaries and which can be implemented efficiently, the signaling functions from the lower communication layers that are missing due to the method according to the invention are simulated through the introduction of event loops EVLP1, EVLP2 on both sides of the communication.

Figure 3:
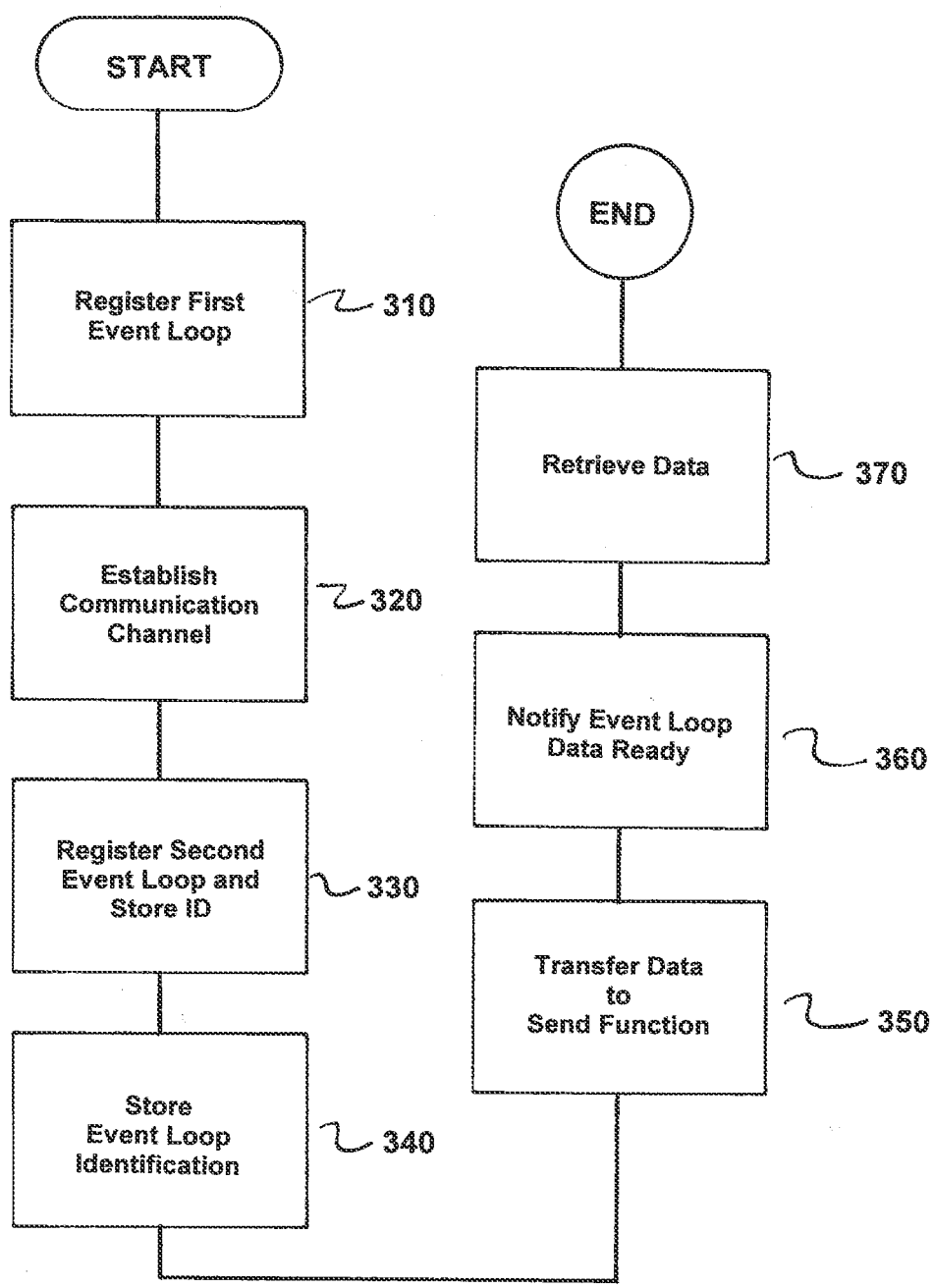
FIG. 3 is a flow chart of the method in accordance with the invention.

FIG. 3 is a flowchart of the method for communicating including exchanging data between a first computer R1, a second computer R2 and at least one automation device AV over a wide area network WAN via an application-specific protocol AP, where one computer of the first and second computers R1, R2 has a local network connection LAN to the automation device AV the application-specific protocol AP ha an application layer APPL, the first computer R1 execute a first automation program ASP1 and the second computer R2 executing a second automation program ASP2. The method comprises registering a first event loop EVLP1 having a first identification ID in the application layer APPL of the application-specific protocol AP of one computer of the first and second computers R1, R2, as indicated in step 310.

Next, establishing a communication channel (T) between the first computer (R1) and the second computer (R2) is established, as indicated in step 320.

A second event loop (EVLP2) having a second identification (ID2) is now registered in the application layer (APPL) of the application-specific protocol (AP) of a respective other computer of the first and second computers (R1, R2) and the first identification (ID1) is stored, as indicated in step 330.

Next, an identification (ID1, ID2) of an event loop (EVLP1, EVLP2) for which the data is intended in the data is stored, as indicated in step 340.

The data is then transferred to a send function (SEND), as indicated in step 350. Notifying the event loop (EVLP1, EVLP2) whose identification (ID1, ID2) is stored in the data that the data is ready for transmission is notified, as indicated in step 360. Next, the data is retrieved via a receive function (REC) over the communication channel (T), as indicated in step 360.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for communicating including exchanging data between a first computer, a second computer and at least one automation device over a wide area network via an application-specific protocol, a selected computer from the first computer and the second computer having a local network connection to the automation device, the application-specific protocol having an application layer, the first computer executing a first automation program and the second computer executing a second automation program, the method comprising:

registering a first event loop having a first identification in the application layer of the application-specific protocol of the selected computer from the first computer and the second computer;

establishing a communication channel between the first computer and the second computer;

registering a second event loop having a second identification in the application layer of the application-specific protocol of the selected computer from the first computer and the second computer and storing the first identification;

storing an identification of a selected event loop from the first event loop and the second event loop for which the data is intended in the data;

transferring the data to a send function;

notifying the selected event loop from the first event loop and the second event loop having the identification stored in the data that the data is ready for transmission; and retrieving the data via a receive function over the communication channel.

2. The method as claimed in claim 1, wherein the send and receive functions are implemented such that a proxy provides the send and receive functions as proxy functions and invokes said proxy functions via the communication channel.

3. The method as claimed in claim 2, wherein the communication channel between the first computer and the second computer comprises a communication channel for callbacks.

4. The method as claimed in claim 1, wherein the communication channel between the first computer and the second computer comprises a communication channel for callbacks.

5. The method as claimed in claim 1, wherein notifications via the communication channel comprise callbacks.

6. The method as claimed in claim 1, wherein the first event loop and second event loop comprise invisible windows of one of (i) the operating system of the first computer and the second computer and (ii) the automation program.

7. The method as claimed in claim 1, wherein the communication channel comprises a Transmission Control Protocol or an Hypertext Transfer Protocol tunnel.

8. An automation system comprising:
a first computer;
a second computer; and
at least one automation device;
wherein the first computer is connectable to the second computer via a wide area network;

wherein the first computer, the second computer and the automation device communicate to exchange data over the wide area network via an application-specific protocol;

wherein the application-specific protocol includes an application layer;

wherein a selected computer from the first computer and the second computer includes a local network connection to the automation device;

wherein a first automation program is executable on the first computer;

wherein a second automation program is executable on the second computer;

wherein connections between the first computer and the second computer are established via a communication channel over the wide area network; and wherein the first computer and the second computer:
register a first event loop having a first identification in the application layer of the application-specific protocol of the selected computer from the first computer and the second computer;
establish the communication channel between the first computer and the second computer;
register a second event loop having a second identification in the application layer of the application-specific protocol of the selected computer from the first computer and the second computer and store the first identification;
store an identification of a selected event loop from the first event loop and the second event loop for which the data is intended in the data;
transfer the data to a send function;
notify the selected event loop from the first event loop and the second event loop having the identification stored in the data that the data is ready for transmission; and
retrieve the data via a receive function over the communication channel.

9. The automation system as claimed in claim 8, further comprising:
a proxy configured to provide the send and receive functions as proxy functions and to invoke the proxy functions via the communication channel on the selected computer from the first computer and the second computer.

10. The automation system as claimed in claim 9, wherein the selected computer from the first computer and the second computer forms part of the automation device.

11. The automation system as claimed in claim 8, wherein the selected computer from the first computer and the second computer forms part of the automation device.

12. The automation system as claimed in claim 8, wherein the computer selected from the first computer and the second computer is within a virtual system.

13. A computer having a communication device which communicates via at least one of (i) a wide area network and (ii) a local network, wherein the computer executes an automation program to:
register a first event loop having a first identification in the application layer of the application-specific protocol;
establish a communication channel;
register a second event loop having a second identification in the application layer of the application-specific protocol and store the first identification;
store an identification of a selected event loop from the first event loop and the second event loop for which the data is intended in the data;
transfer the data to a send function;
notify the selected event loop from the first event loop and the second event loop having the identification stored in the data that the data is ready for transmission; and
retrieve the data via a receive function over the communication channel.

14. The computer as claimed in claim 13, wherein the computer forms part of an automation device.

15. The computer as claimed in claim 14, wherein the computer is within a virtual system.

16. The computer as claimed in claim 13, wherein the computer is within a virtual system.

* * * * *